Patented Nov. 26, 1940

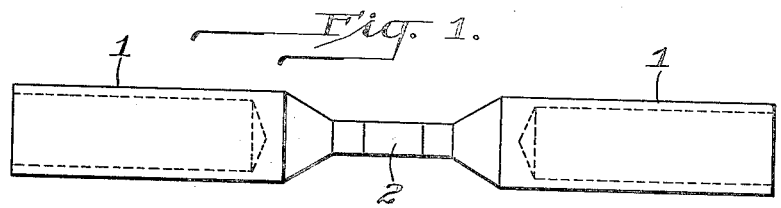
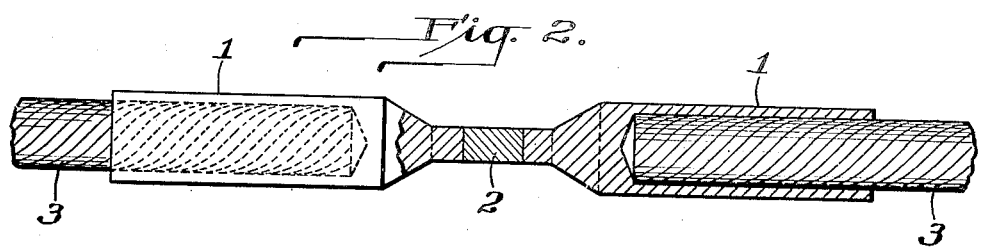
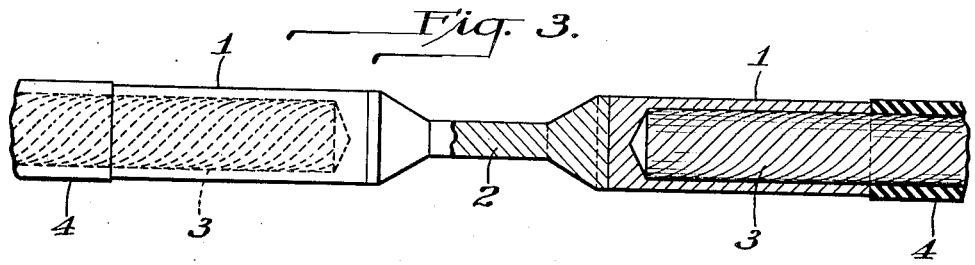

2,222,936

UNITED STATES PATENT OFFICE 2,222,936

CONNECTING DEVICE

Philip T. Coffin, Glen Ridge, N. J., assignor to Aluminum Company of America, Pittsburgh, Pa., a corporation of Pennsylvania Application November 12, 1937, Serial No. 174,187

3 Claims. (Cl. 200—135)

This invention relates to electrical distribution system equipment, and more particularly to devices for connecting ends of electric conductor cable and the like, and for protecting the conductor against overheating.

It is frequently necessary to connect the adjacent ends of sections of cable or wire making up successive portions of lines for transmitting electrical energy, and this is usually done by means of a metal sleeve open at both ends into which the adjoining cable ends are inserted, after which the sleeve is compressed tightly about the enclosed cable ends or is otherwise fastened around the ends of the cable. It sometimes happens that for some reason, for example, a short circuit, the temperature of the cable increases beyond the limit which the line can carry safely, with the result that the cable or insulation may be quickly destroyed. The heat of the cable may also be transmitted to nearby objects, injuring them and even setting them afire. No entirely satisfactory device has been found heretofore for connecting sections of a line and at the same time protecting them against the above-mentioned dangers, and this is particularly true of lines for transmitting large currents, such as underground distribution lines.

It is an object of this invention to provide a connector for electric lines which will serve to connect adjacent cable or wire ends and will afford protection against damage caused by overheating of the lines. It is a further object of this invention to provide a connector for electric lines which consists of a pair of hollow metal terminals joined by a fusible element having a lower melting point than the said terminals. It is a further object of the invention to provide a connector for electric lines which consists of a pair of hollow copper cylinders adapted to receive cable ends and joined by a piece of aluminum resistance butt-welded to adjacent ends of the copper cylinder. Other objects of the invention will be apparent from the following specification and claims, and from the accompanying drawing in which:

Fig. 1 is a side view of an electric line conductor embodying my invention;

Fig. 2 is a side elevation, partly in section, of the connector shown in Fig. 1, assembled in a transmission line; and Fig. 3 is a vertical section of a connector embodying a modification of my invention in place in a transmission line.

In the form of connector shown in Figs. 1 and 2 of the drawing, the spaced metal terminals 1 are connected by a solid bar or link 2 of fusible metal which is attached to the adjacent ends of the terminals. The link 2 is autogenously welded, as by resistance butt-welding, to the ends of the terminals 1, though other types of connection may be used. The terminals 1 are tubular, with an internal diameter slightly larger than the diameter of the current-conducting cable 3, so that the cable ends may be inserted therein. The said terminals should be made of a metal which is a good conductor of electricity, such as copper, and the fusible link 2 should be of a metal which is also a good conductor of electricity and has a melting point lower than that of the terminals 1 and low enough that the link will melt before the cable reaches a temperature high enough to injure the conductor or its insulation. However, the melting point of the link 2 should be sufficiently high to permit the line to carry the desired normal amount of electric current without melting the link. Where the connector is to be used on a copper line, I prefer to make the terminals 1 of copper, and the fusible link 2 of aluminum or an aluminum base alloy, though other combinations of metals for the terminals 1 and the link 2 may be used.

The type of connector shown in Fig. 3 is similar to that shown in Figs. 1 and 2, except that the link 2 and the ends of the terminals 1 to which it is joined have a different shape than in Figs. 1 and 2, the terminals being of uniform cross-sectional area throughout and the ends of the link 2 being of the same cross-sectional area and configuration as the terminals to which they are attached, but having an intermediate portion of reduced cross-section. It will be appreciated that the amount of current which the line can carry and the amount of heat which the link 2 will withstand can be controlled to some extent by the cross-sectional area and shape of the link. Various other modifications in the shape of link 2 may be made, of course, without departing from the spirit and scope of my invention. As shown in Fig. 3, the connector may be used with insulated cables or wires, the insulation 4 covering the cables except at the ends inserted in the terminals.

Connectors made according to my invention are introduced in an electric line by inserting adjoining ends of the cables 3 in the recesses in the terminals 1, after which the terminals are fastened tightly to the cables 3 by compressing them into intimate engagement with the cables by means of tools well known in the art for compressing sleeves and the like around cables.

Other methods of retaining the cable ends in the terminals may also be used. If, for any reason, the current of electricity causes the temperature of the cable to rise above the melting point of the link 2, that element of the connector will melt and break the circuit, thus preventing damage to the cable or to the cable insulation, and avoiding the danger of setting fire to nearby inflammable material. The link 2 should be so designed that the desired amount of current may be transmitted through the line, but if the current causes the temperature of the line to exceed the limits of safety, the link 2 will then melt and break the circuit.

In the preferred form of connector, the terminals 1 are of copper or a copper base alloy, and the link 2 is of aluminum or an aluminum base alloy, the terminals being resistance butt-welded to the link 2. Such connectors in which the link 2 is of the same size and shape have uniform characteristics, and their characteristics remain uniform indefinitely under normal conditions, with the result that each circuit in which similar connectors are used will be broken at substantially the same temperature and current conditions. Consequently, the conditions under which a circuit will be broken can be estimated accurately in advance. Furthermore, the joint is such between the copper terminals 1 and the aluminum link 2 that the loss of energy at that point is negligible, making for maximum efficiency in the line, and this characteristic will be retained indefinitely.

The connectors described above are compact, durable, efficient, and easily incorporated in electric lines. They are particularly suitable for use in underground lines, where, because it is often difficult to gain access to the cause of over-heating of a line, serious damage may result before the difficulty can be remedied if some means of protection such as my invention is not used. They can be used to localize faults in the line at points where ready access may be had to the line.

In the accompanying claims, the term "aluminum" refers to aluminum and aluminum base alloys, and the term "copper" refers to copper and copper base alloys.

I claim:

1. A mechanical cable connector of the class described adapted to protect a copper current distribution system against electrical current overload, comprising a plurality of copper sleeves adapted to engage a plurality of cable ends, an aluminum portion intermediate said sleeves forming an integral mechanical part of the connector and serving as a current overload fuse in the distribution system.

2. A mechanical cable connector adapted to protect a copper current distribution system against electrical current overload, comprising a plurality of copper sleeves adapted to engage a plurality of cable ends, an aluminum portion intermediate said sleeves and autogenously welded thereto, said aluminum portion forming an integral mechanical part of the connector and serving as a current overload fuse in the distribution system.

3. A mechanical cable connector adapted to protect a copper current distribution system against electrical current overload comprising a pair of oppositely disposed copper sleeves adapted to engage a pair of cable ends, said sleeves having their openings disposed about a common axis, an aluminum portion intermediate said sleeves lying wholly within the axially projected area of the sleeves and autogenously welded to the sleeves, said aluminum portion forming an integral mechanical part of the connector and serving as a current overload fuse in the distribution system, said connector being adapted to maintain the joined cable ends in rigid alignment.

PHILIP T. COFFIN.